US005564619A

United States Patent [19]
Childree

[11] Patent Number: 5,564,619
[45] Date of Patent: Oct. 15, 1996

[54] METHOD OF JOINING ALUMINIUM PARTS BY BRAZING

[75] Inventor: David L. Childree, Livermore, Calif.

[73] Assignee: Kaiser Aluminum & Chemical Corporation, Pleasanton, Calif.

[21] Appl. No.: 544,008

[22] Filed: Oct. 17, 1995

Related U.S. Application Data

[60] Continuation of Ser. No. 365,789, Dec. 29, 1994, Pat. No. 5,535,939, which is a division of Ser. No. 195,067, Feb. 14, 1994, Pat. No. 5,422,191.

[51] Int. Cl.$^6$ ..................................................... B23K 1/19
[52] U.S. Cl. ....................... 228/252; 228/183; 228/262.51
[58] Field of Search ..................................... 228/183, 208, 228/223, 252, 254, 262.51, 56.3

[56] References Cited

U.S. PATENT DOCUMENTS

| | | | |
|---|---|---|---|
| 3,272,624 | 9/1966 | Quaas | 75/138 |
| 3,678,568 | 7/1972 | Knippenberg et al. | 228/124.5 |
| 3,859,145 | 1/1975 | McGlasson et al. | 428/654 |
| 3,891,400 | 6/1975 | Robinson | 428/654 |
| 4,172,181 | 10/1979 | Kuwase et al. | 428/654 |
| 4,173,302 | 11/1979 | Schulze et al. | 228/221 |
| 4,203,490 | 5/1980 | Terai et al. | 428/654 |
| 4,721,653 | 1/1988 | Oda et al. | 428/654 |
| 4,929,511 | 5/1990 | Bye, Jr. et al. | 228/56.3 |
| 4,934,581 | 6/1990 | Ibe et al. | 228/190 |
| 5,069,980 | 12/1991 | Namba et al. | 428/654 |

FOREIGN PATENT DOCUMENTS

| | | | |
|---|---|---|---|
| 59-100249 | 6/1984 | Japan | 428/654 |
| 91963 | 4/1989 | Japan | 228/183 |
| 3-19291 | 3/1991 | Japan . | |
| 832791 | 4/1960 | United Kingdom | 428/654 |

Primary Examiner—Samuel M. Heinrich
Attorney, Agent, or Firm—Gerald D. Haynes

[57] ABSTRACT

An aluminum brazing alloy composite sheet is provided which can be utilized in both the vacuum brazing process and the controlled atmosphere brazing process for the brazing of aluminum parts, The brazing alloy composite sheet consists of an aluminum core alloy of the 3XXX, 5XXX or 6XXX type clad at least on one major surface with a lithium-containing aluminum filler alloy containing from about 0.01% to about 0.30% by weight lithium, The core alloy may contain up to about 2% by weight magnesium and is suitable for producing aluminum alloy heat exchanger assemblies, such as radiators or evaporators,

9 Claims, 3 Drawing Sheets

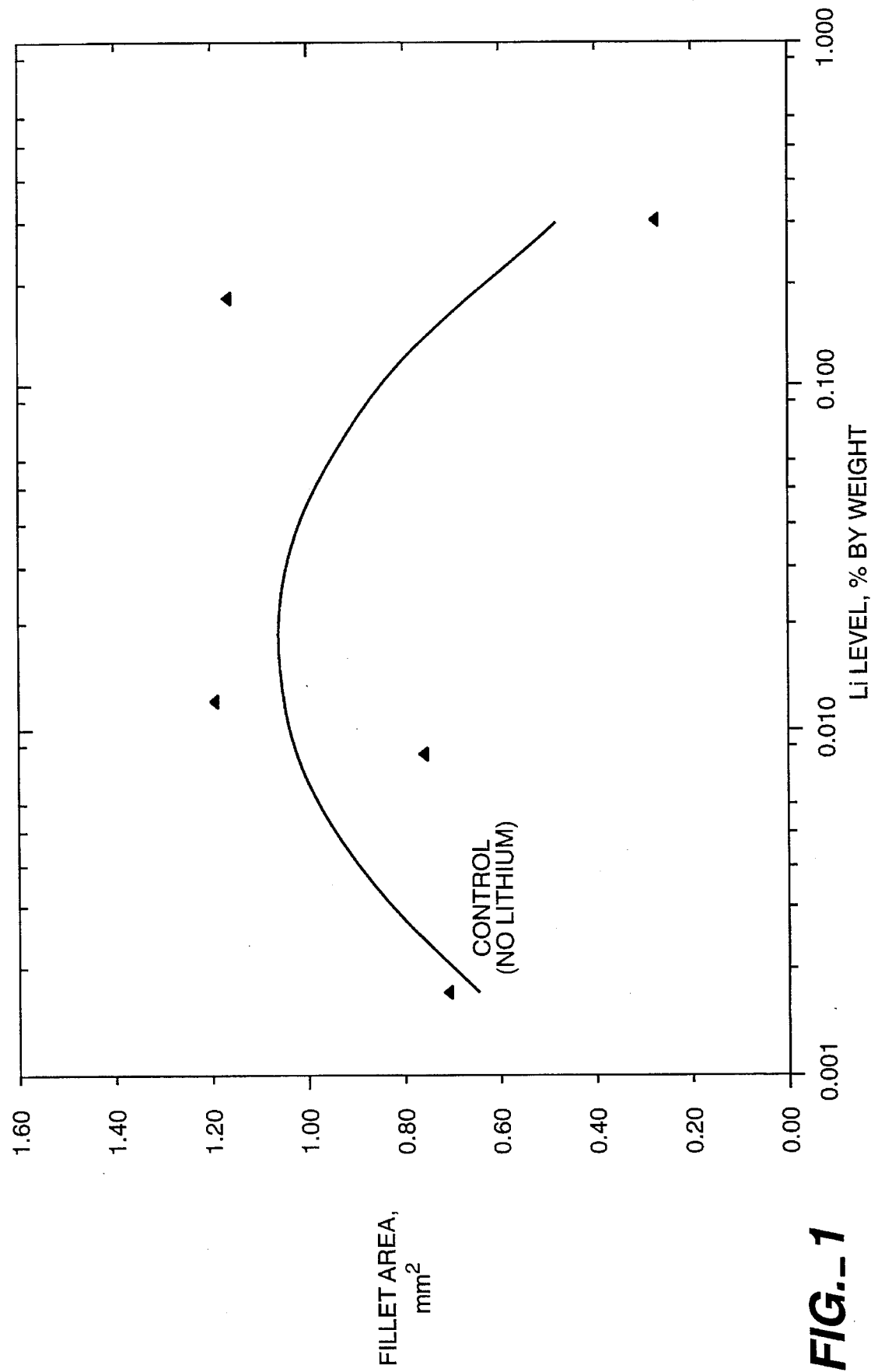
FIG._1

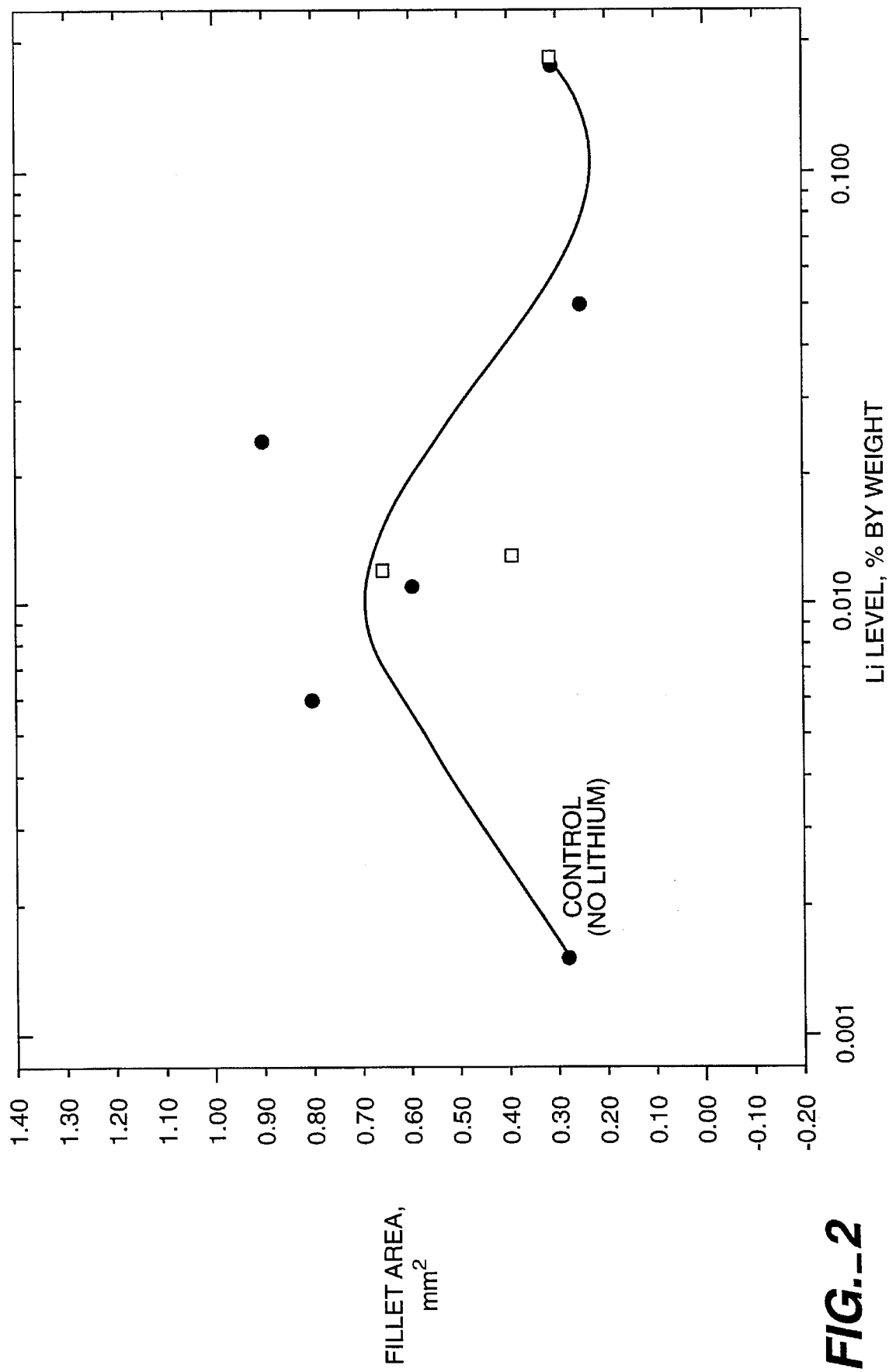
FIG._2

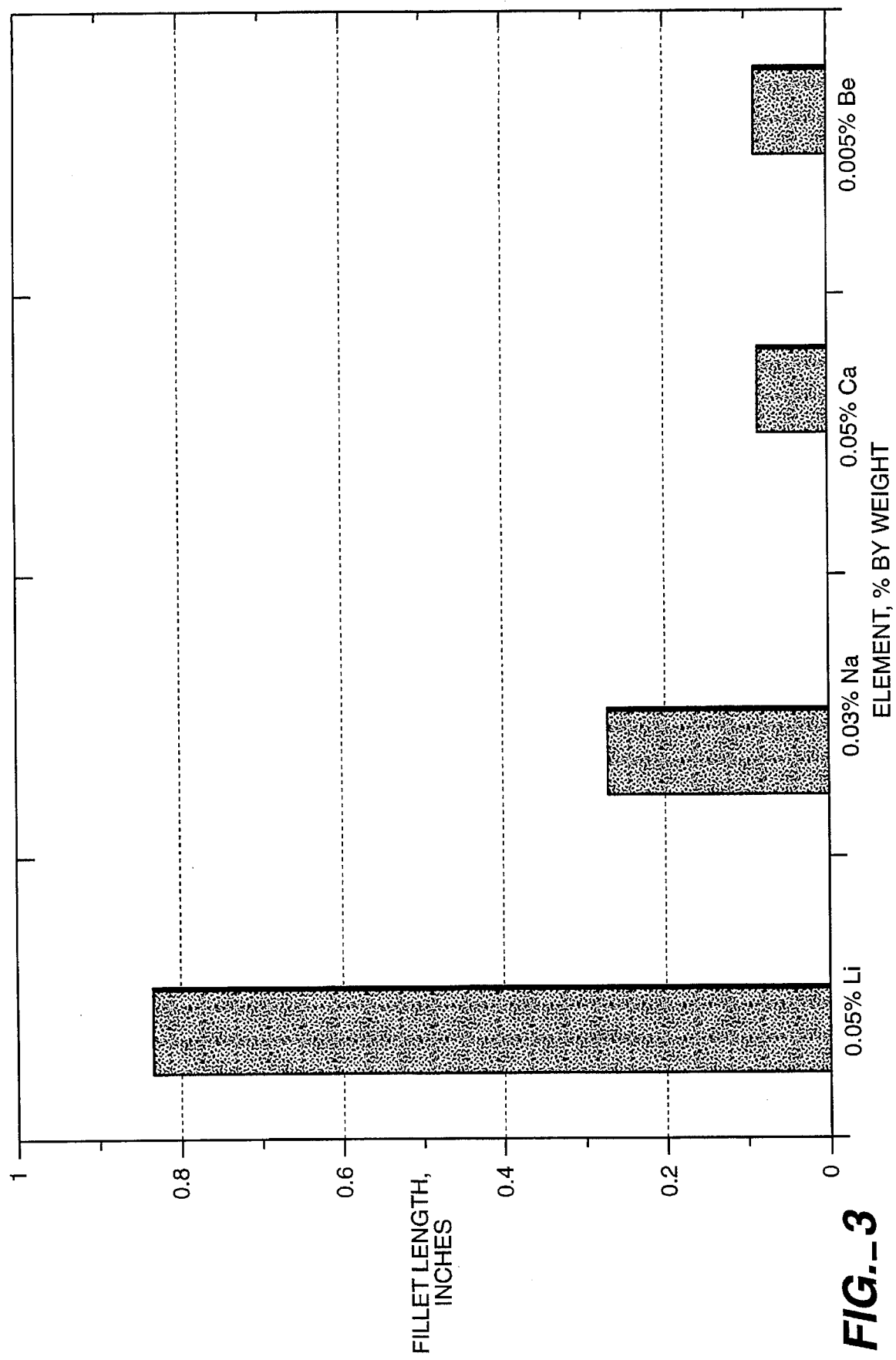
FIG._3

METHOD OF JOINING ALUMINIUM PARTS BY BRAZING

This is a continuation of application Ser. No. 08/365,789, filed Dec. 29, 1994, now U.S. Pat. No. 5,535,939, which is in turn a divisional application of application Ser. No. 08/195,067, filed Feb. 14, 1994, now U.S. Pat. No. 5,422, 191, issued Jun. 6, 1995.

BACKGROUND OF THE INVENTION

Joining of aluminum by brazing is a well known process due to the strong and uniform joints that can be produced between aluminum parts of varying shapes and types. There are four major brazing processes utilized for the joining of aluminum parts, these are: (a) the flux dip brazing process wherein the parts to be joined are dipped into a molten flux bath utilizing a mixture of chloride and fluoride salts; (b) the furnace brazing process which employs a small amount of flux, for example a chloride salt; (c) the controlled atmosphere brazing process which uses a small amount of fluoridic salt and an inert gas atmosphere, for example nitrogen, argon or helium; and (d) the vacuum brazing method which uses no flux but instead utilizes a reduced pressure atmosphere for the joining of the aluminum parts.

Each of these brazing methods has advantages and disadvantages. For example, the flux dip brazing process is associated with environmental problems arising out of the disposal of the used flux baths. Also, the aluminum parts joined by the flux dip brazing process must be thoroughly cleaned after fluxing to avoid the corrosive effects of the residual flux on the aluminum surfaces.

In the furnace brazing process, much less flux is utilized and the flux is directly deposited on the surfaces of the parts to be joined. Thus, there is no flux bath disposal problem. The flux remaining on the surface must be removed from the brazed surfaces to minimize the corrosive effects of the flux. Nevertheless, the furnace brazing process cannot be readily utilized for the brazing of those aluminum alloys which have a relatively high magnesium content. Typical examples of those alloys which are not readily brazeable by the furnace brazing method are those aluminum alloys which belong to the Aluminum Association 5XXX series.

The controlled atmosphere brazing process employs an inert gas atmosphere, for example argon or nitrogen gas atmosphere, in the brazing furnace. The inert gas atmosphere brazing employs a relatively small quantity of non-corrosive flux which need not to be cleaned from the brazed surfaces. The fluoridic flux is expensive and in composite brazing sheets undesirable interactions between the fluoride flux and magnesium limit the maximum core alloy magnesium content to about 0.3%.

In vacuum brazing no flux is employed and the method is suitable for joining those aluminum alloys which contain about 0.1–1.75% by weight magnesium or even more. Due to the magnesium content of the aluminum alloy core, the brazed assembly is capable of exhibiting higher strength properties. Vacuum brazing requires a well sealed furnace, careful control of the pressure within the furnace, both of which may impart higher costs to the brazing process. Additionally, in the vacuum brazing process, assembly tolerances must be critically controlled and the cleanliness of the parts is imperative.

For many applications, especially where strength was a major consideration, the use of aluminum alloys containing magnesium (Mg) up to about 2.00% was desired. Joining of such magnesium-containing alloys by brazing could only be accomplished through use of the vacuum brazing process. Vacuum brazing however, requires the installation of an expensive vacuum brazing furnace and thus the process becomes capital intensive.

Those aluminum alloys which are essentially Mg-free cannot be brazed by the vacuum brazing process. Currently, for joining these Mg-free aluminum parts the controlled atmosphere brazing method, employing for example nitrogen atmosphere, is used in the presence of a fluoridic flux. Where brazing of both Mg-free and Mg-containing aluminum alloys was practiced, it was necessary to segregate the different types of alloys and additionally, two different types of furnaces had to be installed, one for controlled atmosphere brazing and the other for vacuum brazing.

Thus, there has been a longstanding need for a filler alloy which could be utilized for the brazing of either magnesium-free or magnesium-containing aluminum alloy parts by controlled atmosphere brazing or by vacuum brazing. Surprisingly, it has been found that an aluminum filler alloy, containing a controlled quantity of lithium can be readily employed for the brazing of Mg-free and Mg-containing aluminum alloys using either the controlled atmosphere (inert gas) brazing method or the vacuum brazing process. The aluminum filler alloy of the invention contains from about 0.01 to about 0.30% by weight of lithium and as a major alloying element silicon, generally within the limits from about 4 to about 18% by weight of the brazing alloy.

It has been recommended in U.S. Pat. No. 3,272,624 (Quaas) to incorporate 0.005–0.010% lithium into aluminum in order to obtain a self-fluxing filler alloy for welding aluminum parts together. The alloy is employed as an extruded or cast wire and is melted during the joining process to obtain a self-fluxing, deoxidizing deposit in the joint area. If desired, up to 18.0% silicon can also be incorporated in the filler alloy. This alloy is employed as a substitute for fluxes containing chloride and fluoride salts since its residue does not need to be removed from the produced joint. Recommended areas of application include carbon arc, oxy-acetylene and inert arc welding. There is no recognition that the presence of the lithium in the aluminum alloy would render it suitable for use as a filler alloy for the brazing of Mg-containing aluminum parts in the presence of fluxes or as a filler alloy in the fluxless vacuum brazing of aluminum components.

U.S. Pat. No. 4,173,302 (Schultze et al) recommends the use of an aluminum brazing alloy which contains 4–20% silicon and between 0.00001 and 1.0% by weight, preferably between 0.005 and 0.1 by weight at least one of the elements of sodium, potassium and lithium. According to this reference the alloy can be utilized in the fluxless brazing of aluminum-containing articles in a non-oxidizing atmosphere or in a low vacuum. The addition of these alkali metals to the brazing alloy is claimed to increase the corrosion-resistance of the brazed joint. The use of these alkali metal-containing brazing alloys is restricted to fluxless, controlled atmosphere brazing and the beneficial effects of these alkali metals are considered equivalent.

U.S. Pat. No. 5,069,980 (Namba et al) describes a clad aluminum alloy suitable for fluxless vacuum brazing. The cladding material is to be used on both sides of a core sheet. It contains 6–14% silicon, 0–0.6% magnesium, balance aluminum and additionally, at least one of the following elements may also be incorporated in the cladding alloy for the improvement of its corrosion-resistance: Pb, Sn, Ni, Cu, Zn, Be, Li and Ge. The role of these additives in the alloy are equated as far as their corrosion-resistance improving effect is concerned.

It has surprisingly been discovered that the presence of lithium in the filler alloy, when added in controlled amounts within the range from about 0.01 to about 0.30% by weight of the alloy, allows the use of the filler alloy for brazing either by the controlled atmosphere brazing method or by the vacuum brazing process.

The universal applicability of the filler alloy of the invention for the brazing of both magnesium-containing and magnesium-free aluminum alloys eliminates the need to segregate these alloys and further provides the freedom to use whichever brazing method is preferred the manufacturer of brazed aluminum assemblies.

BRIEF SUMMARY OF THE INVENTION

A filler alloy is provided which is suitable for brazing both magnesium-free and magnesium-containing aluminum alloys by using either the controlled atmosphere brazing process or the vacuum brazing method. The filler alloy contains from about 0.01 to about 0.30% lithium (Li) and from about 4 to about 18% silicon (Si), zinc (Zn) up to about 2%, manganese (Mn) up to about 1%, impurities not exceeding about 0.15%, balance aluminum (Al). The filler alloy may also contain iron (Fe) in an amount not exceeding about 0.30%, copper (Cu) not exceeding about 0.10%. The filler alloy of the invention is useful for the brazing of aluminum core alloys containing magnesium (Mg) up to about 1.30% by weight. The preferred filler alloy contains from about 0.01 to about 0.18% lithium.

BRIEF DESCRIPTION OF THE DRAWINGS

FIG. 1 graphically shows the correlation between fillet area sizes and filler alloy lithium contents within the range from 0% to 0.30% for vacuum brazed tube-to-header radiator assemblies using aluminum alloy cores and lithium-containing filler alloy claddings.

FIG. 2 graphically shows the correlation between fillet area sizes and filler alloy lithium contents within the range from 0% to 0.30% for controlled atmosphere brazed tube-to-header assemblies using aluminum alloy cores and lithium-containing filler alloy claddings.

FIG. 3 graphically compares the effects of Li, Ca, Na and Be in the filler alloy on brazeability.

DETAILED DESCRIPTION OF THE INVENTION

This invention relates to the brazing of aluminum articles. More particularly, this invention relates to a novel Li-containing aluminum filler alloy suitable for the brazing of both Mg-free and Mg-containing aluminum alloy articles by either the controlled atmosphere brazing process or by the vacuum brazing method.

For the purposes of this invention, and as used hereinafter, the terms "controlled atmosphere brazing" or "CAB" refer to a brazing process which utilizes an inert atmosphere, for example nitrogen, argon or helium in the brazing of aluminum alloy articles.

The term "vacuum brazing" as used herein refers to a process which employs reduced pressure in the brazing of aluminum alloy articles.

The filler alloy of the present invention, whether or not its use is in the controlled atmosphere brazing process or in the vacuum brazing process, contains from about 0.01 to about 0.30% lithium. In addition to the lithium content, the filler alloy also contains from about 4 to about 18% Si. The filler alloy may also contain additional constituents, for example, zinc up to about 2%, manganese up to about 1%, iron in amounts up to about 0.30% and copper up to about 0.10%. The aluminum filler alloy generally also contains the usual unavoidable impurities up to a total amount of about 0.15%. For vacuum brazing, the filler alloy may, if desired, also contain from about 0.1 to about 1.75% Mg.

When the filler alloy is employed in the vacuum brazing process, then it preferably contains from about 0.01% to about 0.18% lithium. This amount of lithium in the filler alloy is sufficient to eliminate the need for gettering with magnesium and provides a more satisfactory atmosphere in the vacuum brazing furnace. For the purposes of this invention, gettering refers to the removal of the oxygen content of the furnace by the chemical reaction of the magnesium with the oxygen. Additionally, the elimination or the reduction of the required magnesium level in the vacuum brazing furnace through the use of the lithium-containing filler alloy extends the furnace life.

In the event the filler alloy is employed in the CAB process, for example in combination with the well-known NOCOLOK™ fluoridic flux, then the lithium content of the filler alloy is also preferably maintained within the range from about 0.01 to about 0.18%.

The novel filler alloy is generally employed in the form of a brazing sheet rolled from ingots having the desired alloy composition. Regardless of which brazing process the brazing sheet is going to be used in, for best results it is applied to the surface of the aluminum core alloy through cladding. Cladding of the aluminum core alloy with the brazing sheet is accomplished by methods well-known in the art, for example by pressure welding through a rolling process. Depending on the assembly to be made the brazing or filler alloy sheet may be applied to one or both sides of the aluminum core alloy. The thickness of the brazing sheet applied to the surface of the core alloy is usually within the range from about 5 to about 20% of the thickness of the aluminum composite. Thus, for example, if the thickness of the aluminum composite is about 0.1 inch (2.54 mm), then the thickness of the cladding applied to the surface of the aluminum core can vary between 0.005 and 0.020 inch (0.127–0.508 mm). The types of aluminum core alloys, which are clad with the novel filler or brazing alloy sheet, are generally selected on the basis of the end use of the brazed assembly. Suitable aluminum core alloys which can be clad with the novel filler alloy composition include those aluminum alloys which are classified as 3XXX, 5XXX and 6XXX aluminum alloys by the Aluminum Association, the 3XXX alloys being preferred.

The clad aluminum composite may be subjected to a heat-treatment to improve its physical properties. Thus, the clad composites of the present invention may be subjected to a heat-treatment equivalent, for example, to H-temper.

The clad aluminum alloy compositions of the present invention can be readily employed for making brazed heat exchanger assemblies, such as radiators and components for such heat exchangers. Other applications are also possible, for example, utilization of the aluminum alloy brazing composition in the manufacture of evaporators.

The brazing of the assemblies made from the aluminum core alloys clad with the Li-containing brazing sheet is accomplished according to principles well-known in the brazing art. For example, in the CAB process, flux can be applied to the aluminum parts to be joined, then the assembly is preheated, for example to a temperature in the range from about 425°–475° F. (224°–246° C.). The assembly is then transferred to a prebraze chamber where it is soaked for about 3–15 minutes at about 750° F. (399° C.). Subsequently, the hot assembly is transferred to the brazing furnace which is purged with dry nitrogen. The assembly is kept then for 2–3 minutes at about 1095°–1130° F. (591°–610° C.) in the CAB furnace. The brazed assembly is then cooled, removed, and applied for its intended use.

If the vacuum brazing process is utilized for the joining of aluminum parts, no flux is applied to the joint area. The assembly to be brazed is usually preheated to about 425°–700° F. (224°–371° C.) and then introduced into the vacuum furnace. In the vacuum furnace, the preheated assembly is heated in stages to about 1095° F.–1120° F. (591°–604° C.) and then kept at temperature for about 3 minutes. Subsequently, the brazed assembly is cooled to about 1050°–1070° F. (566°–577° C.) and then removed from the vacuum furnace to be used for its intended purpose.

In the case of Mg-containing and also Mg-free aluminum core alloys, regardless of the brazing methods applied, the strengths of joints formed as measured by the area, weight or length of the filler in the joints of the assemblies, are substantially the same. This fact indicates that the novel, lithium-containing filler alloy can be readily employed for the production of vacuum or CAB brazed assemblies made from both Mg-free and Mg-containing aluminum core alloys when such core alloys clad with the novel Li-containing brazing sheet.

The following examples will further demonstrate the unique brazing capability of the lithium-containing filler alloy and the applicability of such filler alloy for the brazing of both Mg-free and Mg-containing alloys using either the CAB method or the vacuum brazing process.

EXAMPLE 1

Experiments were conducted to establish the effectiveness of a lithium-containing filler alloy for the production of satisfactory brazed joints between Mg-containing aluminum core alloy parts. The experiments were conducted by brazing radiator test assemblies by both the vacuum brazing and controlled atmosphere brazing methods.

Aluminum brazing sheets, having a thickness of 0.015 inch (0.0381 mm) and a composition shown in Table I, were roll clad on one side with the filler alloys having varying lithium contents and an overall composition shown in Table II. The cladding layer on the cores was equivalent to about 10% of the total thickness of the clad composite. The composites were partially annealed to the H-24 temper in dry nitrogen at about 540° F. (282° C.) for a time period of about 4 hours. The partially annealed core alloy-filler alloy composites were then used to make automotive radiator tube and header test samples which were then brazed together by the vacuum brazing method and also by the controlled atmosphere brazing method under conditions described below. The strength of the joints formed in both types of brazing methods were then tested by measuring the size of the areas of the fillets formed in the joints.

TABLE I

Composition of Aluminum Core Alloy

| Element | Weight % |
| --- | --- |
| Si | 0.10 |
| Fe | 0.20 |
| Cu | 0.33 |
| Mn | 1.10 |
| Mg | 0.45 |
| Ti | 0.05 |
| Others (total) | 0.15 |
| Balance aluminum | |

TABLE II

Composition of the Li-containing Filler Alloy

| Element | Weight % |
| --- | --- |
| Li | 0.01–0.30* |
| Si | 9.50 |
| Fe | 0.30 |
| Cu | 0.10 |
| Mn | 0.05 |
| Mg | 0.05 |
| Zn | 0.08 |
| Others (total) | 0.15 |
| Balance aluminum | |

The tube and header test samples, each of which had a different lithium content in the clad layer, were at first degreased and then assembled. The brazing of the assemblies proceeded as follows:

(a) Vacuum Brazing

The degreased assemblies were preheated in vacuum to 450° F. (232° C.) for 5 minutes, then they were transferred to the vacuum brazing furnace chamber where they were step-wise heated at first to 1000° F. (538° C.) in 10 minutes, then to 1095°–1120° F. (590°–604° C.) in 6 minutes. The assemblies are then kept within the 1095°–1120° F. (590°–604° C.) range for about 3 minutes, then cooled. The strength of the brazed joints was then subjected to testing by determining the areas of the formed fillets. The results of tests are graphically shown in FIG. 1.

(b) Controlled Atmosphere Brazing

A NOCOLOK™ type flux, containing a fluoridic water-insoluble salt, was deposited on the surface of the degreased assemblies in an amount corresponding to about 5 grams/m² surface. The fluxed assemblies were preheated to 450° F. (232° C.) for 15 minutes then transferred to the prebraze chamber where they were soaked at 750° F. (399° C.) for 10 minutes. Subsequently, the preheated assemblies were transferred to the braze chamber (which was purged for 2 hours with dry $N_2$ prior to the brazing) where they were kept at about 1100° F. (593° C.) for 3 minutes and then removed. The strengths of the brazed joints of the assemblies were then tested by determining the areas of the fillets formed during brazing under controlled atmosphere. The test results are graphically illustrated in FIG. 2.

EXAMPLE 2

Test were also conducted to compare the effects of substituting lithium with calcium, sodium and beryllium in the filler alloy. Thus, samples were prepared by replacing the lithium content of the filler alloy composition shown in Table II with substantially equivalent quantities of calcium, sodium and beryllium. For comparison, a lithium-containing sample was also used. The Li, Ca, Na and Be-containing filler alloys were then tested by measuring the fillet lengths formed when subjected to a conventional test based on the comparison of their respective surface tension which is a measure of brazeability. It was found that the fillet lengths and thus the strength properties of the fillets formed from the calcium, sodium and beryllium-containing filler alloys were significantly below the strength level of the lithium-containing filler alloy. The results of the comparative tests performed with Li, Ca, Na and Be-containing filler alloys are graphically depicted in FIG. 3.

What is claimed is:

1. A process for joining aluminum parts by brazing to produce an assembly, the process comprising:
   (a) providing a composite sheet having an aluminum core alloy material and a filler alloy cladding, applied to the core alloy material, the cladding comprising about 4 to 18 wt. % silicon; about 0.01 to 0.30 wt. % lithium; not more than about 2 wt. % zinc; not more than about 1 wt. % manganese; not more than about 0.30 wt. % iron; not more than about 0.10 wt. % copper; not more than about 0.05 wt. % magnesium; not more than 0.15 wt. % impurities; balance aluminum;
   (b) contacting an aluminum part with the filler alloy cladding;
   (c) brazing the aluminum part and the composite sheet to produce a brazed assembly.

2. The process of claim 1 wherein the brazing occurs in a reduced atmosphere environment.

3. The process of claim 1 wherein the brazing occurs at a pressure greater than atmospheric.

4. The process of claim 1 further comprises applying a flux to the aluminum part prior step (c).

5. The process of claim 4 is selected from the group consisting of chlorides, fluorides, and mixtures thereof.

6. The process of claim 1 wherein the assembly is a heat exchanger.

7. The process of claim 1 wherein the assembly is an evaporator.

8. The process of claim 1 wherein the filler alloy comprises a lithium content ranging from about 0.01 to 0.18 wt. %.

9. The process of claim 1 wherein the brazing composite core material is selected from the group consisting of the Aluminum Association 3XXX, 5XXX, and 6XXX series aluminum alloys.

* * * * *